US006804624B2

(12) United States Patent
Silverman (10) Patent No.: US 6,804,624 B2
(45) Date of Patent: Oct. 12, 2004

(54) SYSTEM AND METHOD FOR DETERMINING THE LOCATION OF REMOTE DEVICES

(75) Inventor: Robert M. Silverman, Westfield, NJ (US)

(73) Assignee: International Business Machines Corporation, Armonk, NY (US)

( * ) Notice: Subject to any disclaimer, the term of this patent is extended or adjusted under 35 U.S.C. 154(b) by 13 days.

(21) Appl. No.: 10/147,769

(22) Filed: May 16, 2002

(65) Prior Publication Data

US 2003/0046022 A1 Mar. 6, 2003

Related U.S. Application Data

(63) Continuation-in-part of application No. 09/945,172, filed on Aug. 31, 2001.

(51) Int. Cl.[7] .................................................. G06F 9/35
(52) U.S. Cl. ........................ 702/159; 702/188; 702/189
(58) Field of Search ................................. 702/159, 188, 702/189, 36, 39, 59, 147, 149, 158; 455/456.6; 342/52; 709/219

(56) References Cited

U.S. PATENT DOCUMENTS

| 5,247,464 | A | 9/1993 | Curtis ........................ 364/562 |
|---|---|---|---|
| 5,365,509 | A | 11/1994 | Walsh .......................... 370/13 |
| 5,771,274 | A | 6/1998 | Harris .......................... 379/26 |
| 5,946,373 | A | 8/1999 | Harris .......................... 379/26 |
| 6,041,352 | A | 3/2000 | Burdick et al. ............. 709/224 |
| 6,104,815 | A | 8/2000 | Alcorn et al. ................ 380/251 |
| 6,131,067 | A | 10/2000 | Girerd et al. ............... 701/213 |
| 6,151,631 | A | 11/2000 | Ansell et al. ............... 709/229 |
| 6,202,023 | B1 * | 3/2001 | Hancok et al. ............. 701/201 |
| 6,205,122 | B1 | 3/2001 | Sharon et al. .............. 370/254 |
| 6,218,983 | B1 * | 4/2001 | Kerry et al. ................. 342/149 |
| 6,272,541 | B1 | 8/2001 | Cromer et al. ............. 709/224 |
| 6,414,635 | B1 * | 7/2002 | Stewart et al. ............. 342/457 |
| 2001/0010541 | A1 * | 8/2001 | Fernandez et al. .......... 348/143 |
| 2003/0074471 | A1 * | 4/2003 | Anderson et al. ........... 709/245 |

FOREIGN PATENT DOCUMENTS

| EP | 0381878 | 8/1990 | .......... H04L/12/26 |
|---|---|---|---|
| WO | WO9959373 | 4/2001 | ............ H04Q/7/20 |

* cited by examiner

Primary Examiner—Marc S. Hoff
Assistant Examiner—Felix Suarez
(74) Attorney, Agent, or Firm—Randall J. Bluestone; Shelley M. Beckstrand (57) ABSTRACT

A system and method for determining the physical location of a target device. Using communications network trace route and pinging commands, the distances of three test devices of known locations to the target device are determined; and responsive to those distances, the location of the target device is determined by triangulation. Based upon location, the target device may be blocked from a communications network or connected to a particular server.

29 Claims, 5 Drawing Sheets

SYSTEM AND METHOD FOR DETERMINING THE LOCATION OF REMOTE DEVICES

CROSS REFERENCE TO RELATED APPLICATIONS

This application claims priority under 35 U.S.C. § 120 as a continuation-in-part application of related U.S. patent application Ser. No. 09/945,172, filed Aug. 31, 2001, entitled "System and Method for Detection of and Reaction to Computer Hacker Denial of Service Attacks", by Robert M. Silverman.

BACKGROUND OF THE INVENTION

1. Technical Field of the Invention

This invention relates to communication networks. More particularly, it relates to monitoring and analyzing any communications network, whether public, private, value add, Internet, or any combination thereof, for the purpose of determining the location of remote devices attached or attaching to that network.

2. Background Art

Managers of information systems for public and private enterprises are required to provide ever-increasing network access to their information systems for remote users. As the business requirement for remote connection to information systems across private and public networks grows, difficulties in maintaining security and adequate performance increase in lock step.

Security

In the current art, security is achieved by means of smart cards, physical verification, passwords, encryption, and fire walls. Smart card security works much in the way that a particular-key opens a particular lock. Physical possession of the card enables the user to operate a remote workstation and access applications on a server. Physical verification security is implemented by means of requiring the of scanning of physiological characteristics of a user (such as the iris of the eye or a thumb print) and requiring that these scanned characteristics match stored values in order for further use of the system to be allowed. Password security for systems and applications requires a user to enter a valid user ID together with a corresponding password consisting of a confidential alphanumeric sequence before access to the resource is allowed. Encryption security works by having a device at each side of a connection encode all transmitted data and decode all received data according to an algorithm set by an encryption key. Without the proper, matched encryption key, the two sides cannot communicate. Firewall security is implemented by network connected devices that examine packets and determine whether to allow the packets to pass depending on whether the origin device and application are allowed to communicate with the target device and application.

While each of these security techniques is effective, none is foolproof. A smart card, password, or encryption key can be stolen or replicated. Physiological scans can compromised by subversion of the database or by mimicry, or the person with the required physical characteristics can be kidnaped and coerced into connecting to the system. And fire walls can be bypassed by mimicry or subversion of the router's tables. For these reasons, organizations often use a plurality of these techniques in combination to protect their proprietary systems.

In many cases, an organization can expect that a particular user will be connecting to a particular application from a particular location or set of locations, and not from certain other locations. As an example, there are foreign countries that the Department of State of the United States either discourages or forbids citizens of the United States to visit. So it might be very unusual for access to certain computer systems in the United States to be allowed from those countries. Or, a secured application might be intended to be accessed by staffs only in a few secured locations, and from nowhere else. Moreover, an organization might want to record the actual location of all users accessing a particular application simply as an audit point and as a means of assisting in identifying who actually was connected. Such proof of connection might serve a purpose similar to the use of video recording equipment at automatic teller machines and other such facilities.

Aside from use of fire walls, the security techniques noted above do not generally apply to public-access systems, such as web sites. For example, anyone can access the IBM Corporation web site to obtain product information without requiring a thumb print, password, encryption key, or smart card. General public access to web sites is desirable as an inducement to increase business. However, as with all open-to-the-general-public systems, some visitors have malevolent intent, such as to disrupt the web site (e.g., DoS, or denial of service attacks) or to break into proprietary systems by using the publically accessible system as an entry point. It would thus be useful to be able to determine the actual location of remote users of both secured-private and open-public computer systems in order to facilitate identification of possible interlopers for security purposes. Such identification can be used either to prevent the interlopers from gaining access to the systems or to assist with the identification of interlopers after the fact, since the current security arts of passwords, encryption, physiological scanning, smart cards, and fire walls cannot always be employed, and when they are employed, they are not foolproof. Moreover, none of these methods can be used readily for after the fact location or identification of interlopers.

Performance

In addition to enabling implementation of new forms of system security, knowing the distance between systems can enable intelligent allocation of resources as well as dynamic tuning for the purpose of improving performance. Currently, in cases in which a service can be provided by multiple resources, systems either allocate a resource for a particular connection based upon round robin alternation (e.g., various implementations of router and communication controller link selection), a table entry (e.g., System Network Architecture class of service subarea route selection), or else on the basis of transmission of a test packet to each possible server, with the first server responding being the one selected for the connection (e.g., token ring network source route bridge path selection, and IBM Network Dispatcher's server selection software). Another resource optimization technique is exemplified by OSPF (Open Shortest Path First) router path selection, which selects network paths on the basis of least number of hops, end-to-end. While OSPF uses a least number of hops algorithm, this does not imply that the path with the least physical distance is selected, because physical distance is not known and is not a consideration.

For currently available work-allocation schemes for network attached devices, no method is available that computes physical distance, so physical distance is not currently a consideration in connection setup algorithms. The ability to calculate physical distance and apply the result to connection setup would be beneficial for at least the following reasons:

(1) Public Application Service Providers (ASPs) provide geographically dispersed web services by means of computer servers located at diverse points at the edge of the Internet. For ASP providers, it would be desirable to know the physical distance between each available server and each connecting user at least to be able to consider physical proximity in the determination of which server will be selected for each connection.

(2) Private application services intended for use only within an organization are increasingly being dispersed over multiple machines because of regulatory requirements (such as SEC requirements for brokerage services to be backed up at another site within four hours of a disaster) or simple business prudence. Once an organization creates backup facilities, it is often prudent to run applications at each service point rather than leave one dormant as a standby. This is because hardware and software problems are unrecognizable in a dormant system, and trying to bring up a recovery system in the face of a disaster while trying to deal with previously undiagnosed hardware and software problems is a major impediment to recovery. With increasing use of technology in which data is mirrored across remote datacenters (such as IBM's Geographically Dispersed Parallel Sysplex technology) it is becoming more common to find one application (for example, order entry) running on physically distant machines. In all cases in which users may connect to identical services provided by multiple, geographically dispersed servers, it is desirable to know the physical distance between each connecting device and each potential server when deciding which server should be selected for the connection.

Heretofore, systems for tuning or optimizing a connection between devices in a data communications network do not involve consideration of the location of the target device. There is a need in the art for a system and method for determining the physical location of devices across multihop communications links using communications network commands.

Global Positioning System

When considering methods for determination of physical location, the Global Positioning System (GPS) must be mentioned. In the GPS system, radio signals transmitted from multiple satellites in earth orbit are collected by receivers, and a form of triangulation analysis is employed by the receiver to calculate the precise location of the receiver. In order for a GPS receiver to be able to perform its calculations, the receiver must employ an almanac-type database from which satellite location can be determined. Since calculation of the location of the receiver is based on the receiver's position relative to a set of satellites, the GPS receiving system must work from precise satellite location, and this process requires a very high degree of time clock coordination. The location calculation process also requires updates known as "ephemeris constant corrections" which are employed to adjust calculations for changing conditions in the ionosphere and troposphere that affect signal propagation from the GPS satellites through the earth's atmospheric layers (e.g., see http://iono.jpl.nasa.gov//latest.html for NASA's realtime North America ionosphere total electron count map).

GPS is not currently used for security and performance enhancements in computer networks, and such use would be inhibited by at least the following factors. First is cost. GPS receivers would have to be employed on all devices requesting connection to networks for service. Since a major purpose of ensuring top performance is to optimize use of resources so that costs can be minimized, requiring a significant investment in added equipment to ensure performance is self-defeating. Second, from the security perspective, assuming devices connecting to a network were outfitted with GPS receivers, each such device connecting to the network would then have to report its location to some entity which could then determine whether the reporting device meets security requirements for connection. This would be fraught with the peril that the reporting device might alter the location information it transmits so as to appear to be a legitimate requester of service when in truth it is not. Third, most computer users are located in facilities in which satellite and other transmissions are either not available or are perturbed. For example, GPS working groups are currently studying ways of improving GPS accessability and accuracy, as described in the introduction of the paper "Improving GPS Coverage: Indoors and Downtown," delivered at the 2001 ION GPS Conference:

"The Global Positioning System (GPS) is a widely acknowledged success story. For over 20 million users it provides worldwide position fixing, in all weather, at all times of day. It provides this service to users at sea, in the air and in space. In general, these users have a clear view of the sky and can receive all satellites in view with little difficulty. These fortunate users enjoy position-fixing accuracies of 10 meters or better. With differential corrections, they can obtain accuracies of better than 1 meter."

"To date GPS has struggled to serve users in cities or other environments with obstructions. These users may not be able to receive signals from the four satellites required for three-dimensional position fixing. Indoors, the user may struggle to find a clear sight line to just one satellite. Yet these urban and indoor users also need to know where they are. For example, emergency (E-911) callers would like to automatically deliver their estimated position when they call for help. When they place an emergency call they are under stress and may be unable provide a clear and accurate description of their location."

("Improving GPS Coverage: Indoors and Downtown," Per Enge, Stanford University; Rod Fan and Anil Tiwari, @Road, Inc,; Andrew Chou, Wallace Mann, Anant Sahai, Jesse Stone and Ben Van Roy, Enuvis, Inc.; presented at the ION GPS Proceedings, 2001.)

This text helps illustrate the fundamental challenges GPS would face in computer and network applications. First, GPS does not work well indoors (especially computer rooms) because of line of sight, poor signal-to-noise ratio, and other receiving problems. Second, GPS requires the receiver to collect multiple satellite transmissions and then either calculate its own position and report it to any other interested party or else (potentially) to forward the received satellite transmission data to some other entity for location analysis, which means that a remote system would be responsible for reporting its own location, which leaves open the security risk of deliberate misrepresentation. These factors, together with the cost of installing GPS prolifically and managing the GPS receivers would make it very difficult for GPS to play a significant role in networked computer security and performance applications.

It should also be noted that the mathematics inherent in the system and method of GPS is based on line of sight visibility and speed of light radio transmission. This can be characterized as a "point-to-point" connection. Any system or method for using the non-line of sight communication media commonly used by computer networks, such as the copper and fiberoptic cables comprising the Internet, corporate, government, and telephone company networks, must account in its mathematical foundation for the speed degradation imposed by the networks' routers. By this it is meant that an individual network packet traveling across 'n' router-connected hops of identical speed will be serialized at a rate of only 1/n when compared with a packet of the same length traveling over a single hop of that speed. In GPS, the line of sight based radio transmission through the atmosphere is a single hop system. Communication networks, including the Internet, are copper and fiber cable-based systems with interspersed routers that do not merely amplify signals, but collect, analyze, and retransmit packets. So unlike GPS, in which the atmospheric conditions and transmission signal speed between a receiver and each of the satellites is quite uniform, the communication networks connecting a target station to each of three or more test stations will generally differ markedly in number of hops and hop speeds. So the methodology and mathematics will differ for such systems, and the system and method for locating devices by network testing must mathematically and methodologically account for these differences.

It is an object of the invention to provide an improved system for determining the location of a remote system.

SUMMARY OF THE INVENTION

A system and method for determining the physical location of a target device. Using network commands, the distances of three test devices of known locations to the target device are determined; and responsive to those distances, the location of the target device is determined by triangulation.

In accordance with an aspect of the invention, there is provided a computer program product configured to be operable for determining the physical location of a target device by triangulation using network pinging and trace route executed by three test stations to determine distances from the test stations to the target device.

Other features and advantages of this invention will become apparent from the following detailed description of the presently preferred embodiment of the invention, taken in conjunction with the accompanying drawings.

DETAILED DESCRIPTION OF PREFERRED EMBODIMENTS

Figure 1:
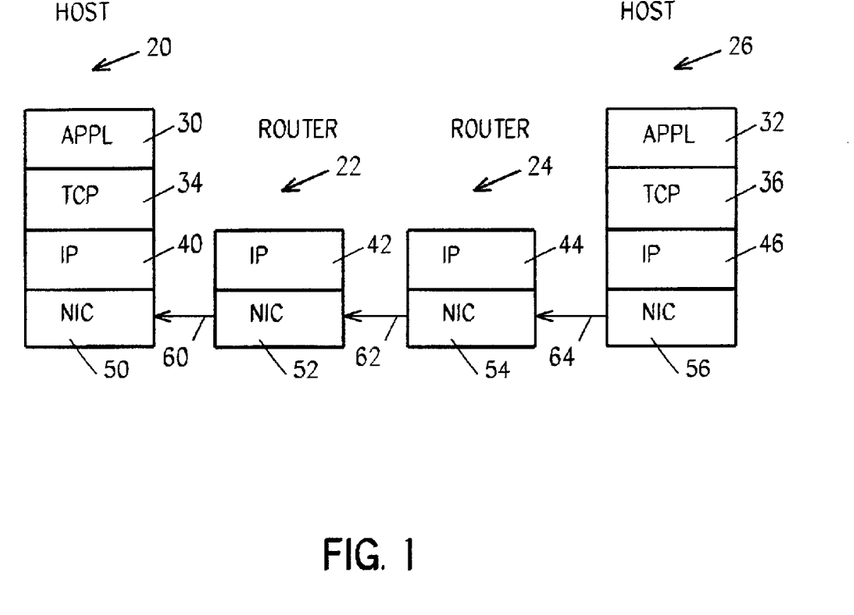
FIG. 1 is a high level system diagram illustrating a network characterized by serialization, device latency, propagation and queue delay.

Referring to FIG. 1, an exemplary network includes hosts 20, 26 connected through routers 22, 24. In this example, hosts 20, 26 include application layers 30, 32, TCP layers 34, 36, IP layers 40, 46 and NIC layer 50, 56, respectively. Routers 22, 24 include IP layer 42, 44 and NIC layers 52, 54, respectively. Host 20 is connected to host 26 through NIC layers 50, 52, 54, and 56, as is represented by lines 60, 62, 64. The components of network delay in such a system, unidirectional from host 26 to host 20, include serialization delay and propagation dely on lines 60, 62, 64, device latency in TCP layers 34, 36, and queue delay in NIC layers 50, 52, 54 and 56. Applications 30, 32 include code for issuing the network pinging and trace route commands, executing the various routines and calculations set forth hereafter for determining distances from test stations to target stations, executing the routine for determining the location of the target station through triangulation, and routines for connecting a target station to a particular server system.

Figure 2:
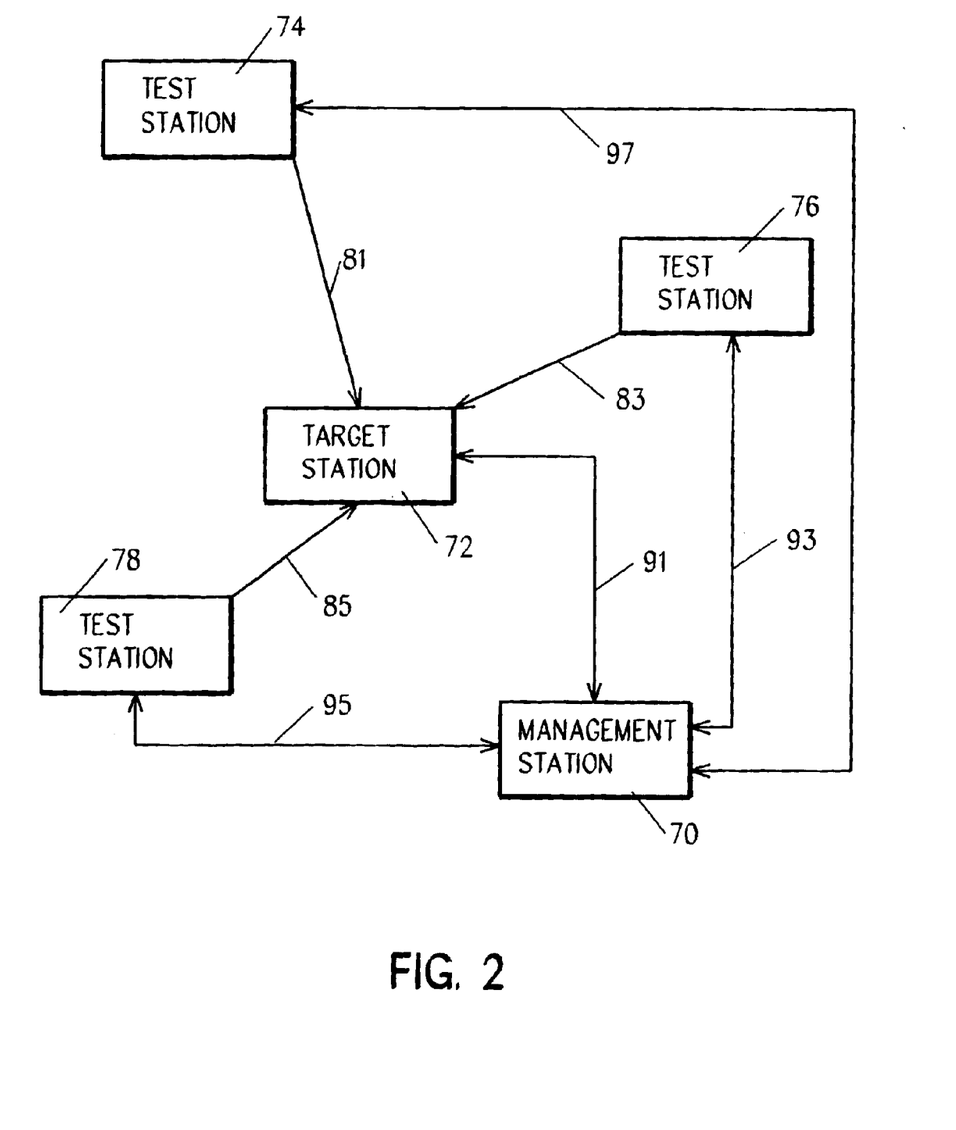
FIG. 2 is a high level system diagram illustrating a communications network and network evaluation system in accordance with the preferred embodiment of the system of invention.

Referring to FIG. 2, in accordance with the preferred embodiments of the invention, a plurality of test stations 74, 76, 78 connect through networks 81, 83, 85 to client station 72 seeking access to, for example, a server or management station 70 over connection 91, which is connected to the test stations through the network or otherwise over lines 97, 93 and 95, respectively. Management station 70 may be the server to which target or client station 72 seeks connection, or some other station (not shown) in the network.

In operation, network evaluation signals, or probative test packets, are selectively sent to and received from target station 72 through a network from three or more test stations 74, 76, 78. Responsive to these evaluation signals, network evaluation parameters are determined and used to determine the speed and latency characteristics of the network and the physical location of target station 72.

Determining the location of devices connected or connecting to a network is done by employing a triangulation method, meaning that at least three test devices 74,76, 78, not aligned in a row, are used to determine the location of a target device 72. Each of the three or more test devices employs portions of the system and method for analyzing a communications network described in patent application Ser. No. 09/452,403, filed Dec. 1, 1999 by R. M. Silverman, et al. for System and Method for Monitoring Performance, Analyzing Capacity and Utilization, and Planning Capacity for Networks and Intelligent, Network Connected Processes to gather data required as input for determining the network's (1) speed (more precisely, the network's end-to-end discrete speed), (2) best round trip time for packets of n bytes, and (3) latency.

In addition each test device 74, 76, 78 employs a trace route command, such as the TCP/IP network Traceroute command, in order to determine the number of routers along the end-to-end path 81, 83, 85, respectively, from itself to the target device 72. Each test device uses the trace route result and the network speed, latency and best round trip packet time that it has calculated between itself and the target station to determine the distance between itself and the target station. As will be more fully described hereafter, this distance determines the radius of a circle, with the test device at its center, somewhere along whose circumference the target device lies. For two test devices, the circles described by their radii will intersect at one or two points. For terrestrial (i.e., two dimensional) location determination, applicable to locating target devices on the earth's surface, the circles described by the radii of three test devices 72, 74, 76, will intersect at one point, which is the location of the target device 72.

Figure 3:
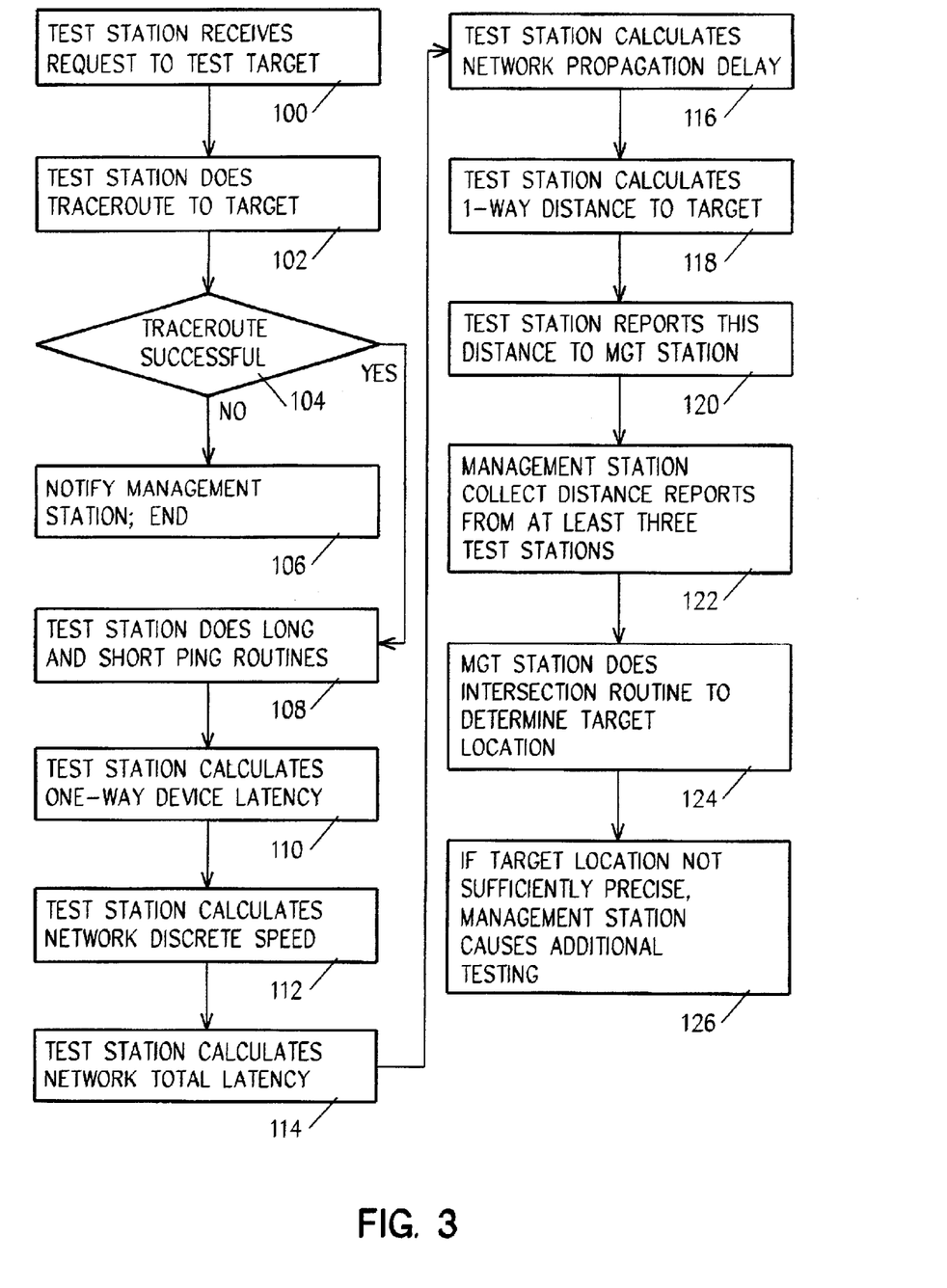
FIG. 3 is a logic flow diagram illustrating the steps of an exemplary embodiment of the method of the invention.

Referring to FIG. 3, in accordance with an exemplary embodiment of the method of the invention, in step 100, test station 74 receives a request to determine the distance to a target station 72 and is notified of its address or name.

In step 102, test station 74 executes a trace route to determine the number of routers in link 81 between test station 74 and target station 72.

In step 104, if the trace route operation of step 102 is not successful, in step 106 management station 70 is notified over link 97 that test station 74 is unable to determine distance and participate in the process of locating target station 72. This alerts management station 70 to locate some other, replacement test station, since a minimum of three are required. If the trace route operation is successful, in step 108 test station executes long and short ping routines with target station 72 over communication link 81 through the network, and time stamps and stores the transmit and receive times for the ping echo packets. In addition, before executing the ping routines, test station 74 may determine network MTU size to ensure that long pings are less than or equal to the network MTU.

In step 110, test station 74 calculates one-way device latency for path 81. This is done using current rules of thumb values or, when possible, using known values for intermediate routers and end stations on path 81. Referring to FIG. 1, a current rule of thumb is 0.0005 seconds each pass through a router 22, 24 and 0.0015 seconds for each pass through an end station 20, 26.

In step 112, test station 74 calculates discreet speed (also referred to as conversational speed).

In step 114, test station 74 calculates total latency.

In step 116, test station 74 calculates network propagation delay, which is equal to total latency (step 114) minus device latency (step 110).

In step 118, test station 74 calculates the one-way distance test station 74 to target station 72 from propagation delay (step 116).

In step 120, test station 74 reports the one-way distance (step 118) to management station 70.

In step 122, management station 70 collects distances (step 118) from at least two other test stations 76, 78—each of which execute steps 102–120 as previously described.

In step 124, management station 70 determines target location using the known locations of test stations 74, 76, 78 and the intersection of circles described by radii (distances from step 118) from these test stations.

In step 126, if the location of target station 72 resulting from step 124 is sufficiently imprecise, management station 70 may do additional testing to more precisely locate target station 72. Such additional testing may involve the use of an expert system, or the use of one or more of the same or different test stations to recalculate the intersection of distance radii about three or more test stations.

Figure 4:
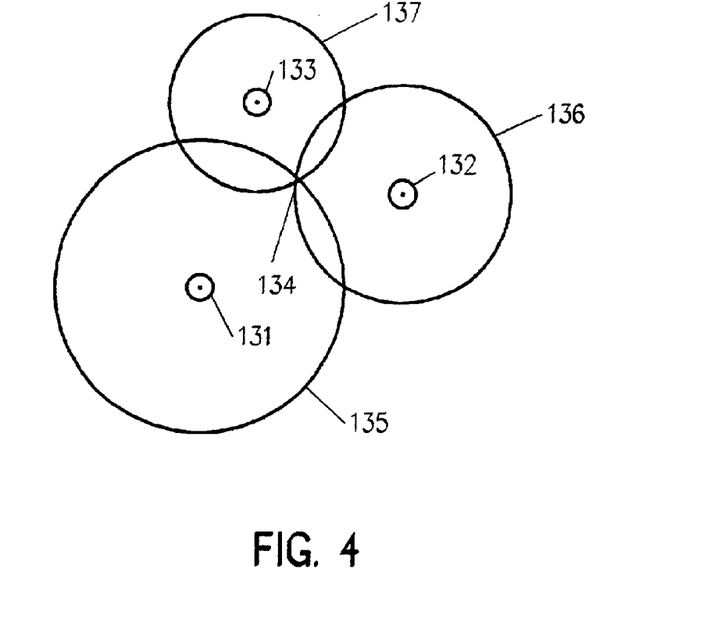
FIG. 4 is a schematic representation of a communications network including three test stations and a target station which lies within the perimeter of the triangle formed by the test stations.

FIG. 4 depicts three test stations 131–133 and a target station 134. In this case, target station 134 lies within the perimeter of the triangle formed by test stations 131, 132, 133, and the measurement of the distance from each test station to the target station 134 is accurate. Each accurate distance calculation describes the radius of a circle 135, 136, 137, respectively, along the circumferences of which target station 134 lies. From any two test stations, there will be two points of intersection of their respective circles' circumferences, and it is at one of these two points of intersection that the target station lies. From three test stations 131–133 having an accurate distance calculation to the target 134, there is a unique point of intersection of the three circles 135–137, and this point is the location of the target device 134.

Figure 5:
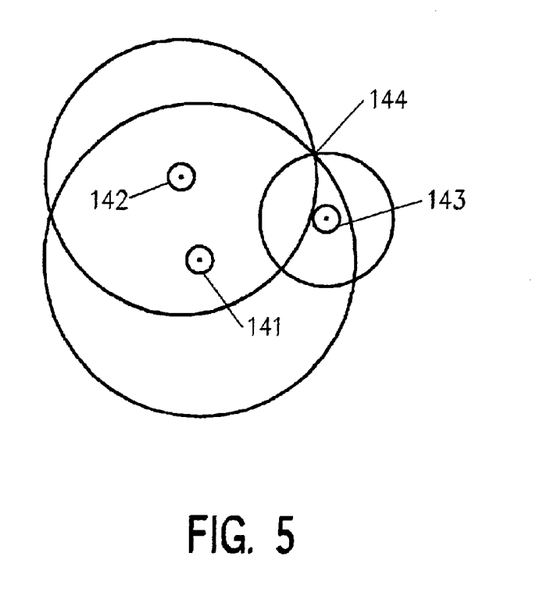
FIG. 5 is a schematic representation of a target station lying outside the perimeter of the triangle described by three test stations.

FIG. 5 illustrates a target station 144 lying outside the perimeter of the triangle described by test stations 141–143. The figure further depicts that when the distance to the target station from each test station is accurately determined and used to describe the radius of a circle whose origin is its respective test station, then the intersection of the three circles is the location of the target station.

Figures 6, 7, 8:
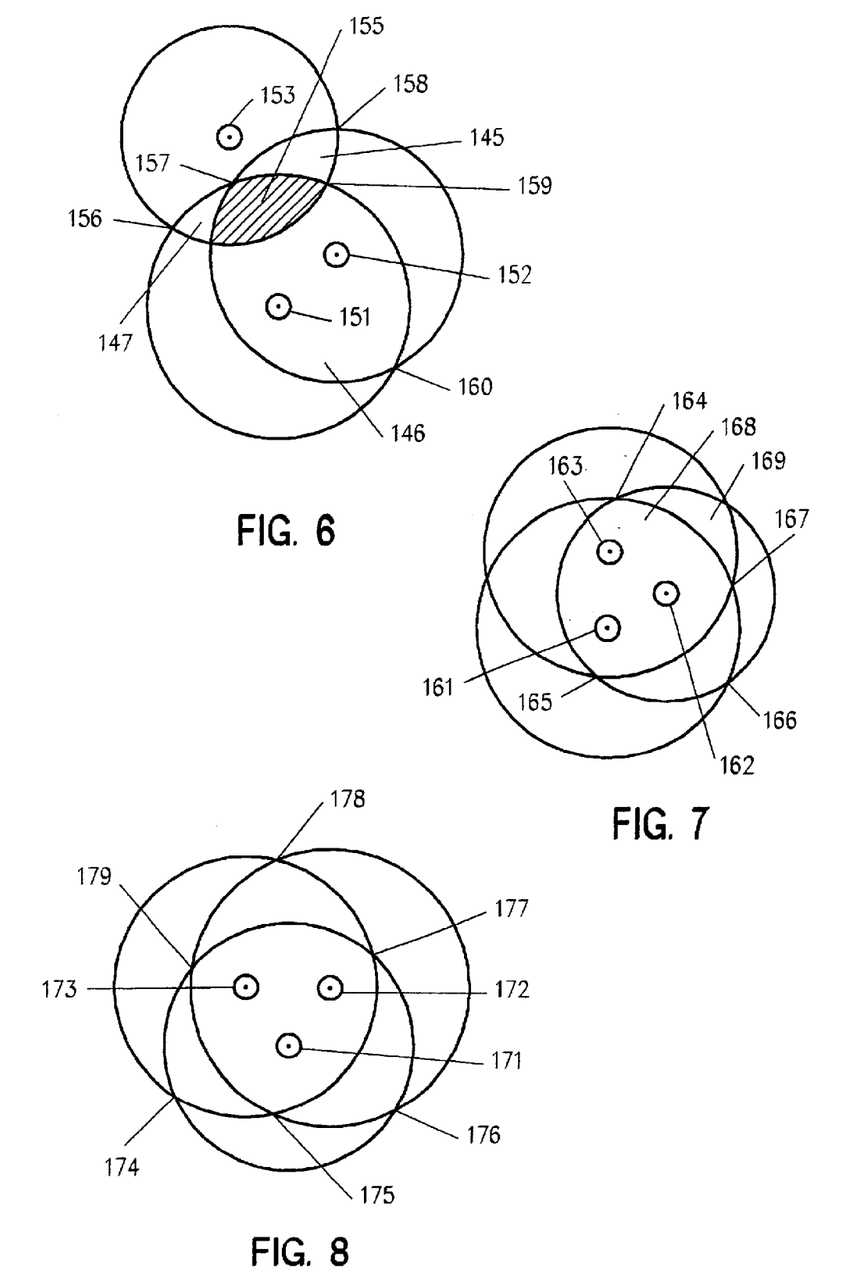
FIG. 6 is a schematic representation of a communication network in which there are accurate distance measurements to a target station from two test stations and a long measurement from a third test station.
FIG. 7 is a schematic representation of a communication network illustrating the case where the measurement to a target station from a first test station is long, resulting in there being an area of trisection within which the target station lies.
FIG. 8 is a schematic representation of an indeterminate case of a communication network in which all connections from the test stations to the target station are long and substantially equidistant.

FIG. 6 illustrates a case in which there are accurate distance measurements from test stations 152 and 153 and a long measurement from test station 151. A long measurement could occur because the network path between test station 151 and target station 154 is not direct. In this case, the intersection of the circles described by the radii of test stations 151–153 is not a single point, but rather is the cross-hatched area 155 lying within the intersection of circles drawn about center points 151–153, including points 154, 157, 159. The target station lies somewhere within this area 155 of trisection. The area of trisection 155 has three adjacent areas of bisection 145, 146 and 147. Area of bisection 145 is defined by circles about test stations 152 and 153 exclusive of area of trisection 155 and therefore defined by points 157, 158 and 159. Area of bisection 146 is defined by the circles about test stations 151, 152, exclusive of area of trisection 155 and therefore defined by points 145, 159, 160. Area of bisection 147 is defined by the circles about test stations 151 and 153, exclusive of area of trisection 155 and therefore defined by points 154, 156 and 157. As a rule, target station 154 lies within the area of trisection 155 in proximity to the minimum sized adjacent area of bisection. In this instance, area of bisection 147 is the smallest adjacent area of bisection, and the target station 154 is predicted to be in the area of trisection 155 in proximity to area of bisection 147. This is true of point 154, which lies along arc 154, 157 separating areas 146, 147.

FIG. 7 illustrates a case in which test station 164 is outside the perimeter of the geographic triangle described by test stations 161–163. In this case, the measurement from test station 163 is long, resulting in there being an area of trisection 168 within points 164, 165, 167 somewhere within which target station 164 lies. By application of the general rule above with respect to FIG. 6, it can be determined that target 164 lies within the area of trisection 168 in proximity to the smallest adjacent area or bisection of two circles, which for purpose of illustration is assumed to be area of bisection 169 (the intersection of circles about test stations 162, 163 exclusive of area of trisection 168). Thus, it is correctly determined that target station 164 lies along arc 164, 176 which is outside of the perimeter defined by a triangle having test stations 161–163 at its vertices, and illustrates the ability of the system and method of the preferred embodiments of the invention to work where network connections are not geographically direct.

FIG. 8 reflects a case in which all connections are long and substantially equidistant, and the location of a target station indeterminate. For example, with a value of 22,000 miles or so, a target station whose network connection to all test stations 171–173 is via a path involving a geosynchronous satellite would appear to have six points 174–179 of bi-circular intersection with no well defined area of trisection (which is the area bounded by arcs 175–177, 177–179 and 179–175). The symmetry and distance would be indicative of a possible satellite connection. Although not illustrated here, it would be possible to subtract out 21,500 miles from the value detected from each station and attempt to see if a tentative location can be determined. This effort will, from a practical viewpoint, likely be of limited value because points of presence for access to satellite systems are often via indirect paths.

The system and method of the preferred embodiment of the invention combines a network probing test frame transmission and analysis method together with a triangulation method for the purpose of locating devices that are connected or connecting to a communications network. These may be used to: provide input for an authorization process, which determines if a user is entitled to receive a service (security); provide input for an identification process, which determines from which device particular requests originated (security and audit); provide input for a demographics process, which determines degree of user connectivity from geographic areas (marketing); and provide input for a tuning process, which determines type of content or connection parameter settings for server-to-user sessions (performance).

A preferred embodiment of the invention provides a system and method for network managers to site test equipment at various locations (at least three locations in triangular arrangement) to locate target devices. This is accomplished using communications network commands.

Referring again to FIG. 2, in the preferred embodiment of the invention, three test stations 74, 76, 78 connected to a communications network are situated in triangular fashion. Each station is capable of transmitting echo packets of different sizes and time stamping and recording the time of transmission and receipt of each echo packet. Each station is also capable of determining the network's MTU size (maximum transmission unit) between itself and any target station 72, and transmitting echo packets to the target of sizes equal to or less than the network's MTU. Each station 74, 76, 78 is also capable of determining the number of routers along the path between it and the target station, round trip. Referring to FIG. 1, by router it is meant an intermediate network device 22, 24 which forwards packets by store-and-forward packet reassembly and retransmission. The required echo packet transmission, receipt, time stamping, MTU determination, and router path determination functions are inherent, for example, in the TCP/IP stack implementations on virtually every device 20–26 connected to the Internet.

With the mechanism described above in place, each test station 74, 76, 78 can determine the speed of its connection 81, 83, 85, respectively, to the target device 72 as follows. (This speed analysis method is further described in Silverman, et al., Ser. No. 09/746,179 filed Dec. 21, 2000 for "System and Method for Determining Network Discrete Utilization". See also, Silverman et al., Ser. No. 09/746,183 filed Dec. 21, 2000 for "System and Method for Determining Network Throughput Speed and Streaming Utilization"; and Silverman, et al., Ser. No. 09/452,403 filed Dec. 1, 1999 for System and Method for Monitoring Performance, Analyzing Capacity and Utilization, and Planning Capacity for Networks and Intelligent, Network Connected Processes", the teachings of which are incorporated herein by reference.) Echo packets of two different sizes are transmitted, each less than the network's MTU, with time stamps recorded for the transmission and receipt times of all packets. For each packet, the transmission time is subtracted from the receipt time, which tells that packet's round trip network time. From all round trip times for the longer of the two packet sizes the lowest detected round trip time is selected (denoted as BLT, best long time), and the same is done to determine the best round trip time for the shorter echo packet (denoted as BST). Denoting the bits per long packet as Lb, and bits per short packet as Sb, the speed of the network, denoted as NS, is:

$$2*[Lb-Sb]/[BLT-BST]=NS. \qquad (1)$$

NS speed is the serialization rate experienced by individual packets end-to-end along the network path and, as described in Silverman, et al. Ser. No. 09/746,183, in multihop connections this speed differs from and is lower than the speed at which streams of packets flow.

From network speed, the network's latency, denoted as NL, is derived as follows:

$$BLT-[2*Lb/NS]=NL. \qquad (2)$$

NL can also be determined by:

$$BST-[2*Sb/NS]=NL, \qquad (2a)$$

or by:

$$\{(BLT-[2*Lb/NS])+(BST-[2*Sb/NS])\}/2=NL \qquad (2b)$$

or by packet sizes other than lengths Lb or Sb.

The total best round trip time is composed of packet serialization time (at each hop, round trip) plus device latency (such as router processing time) plus propagation delay (related to physical distance and light speed). When a sufficient number of samples is taken, the best observed sample's round trip time will not include any queue delay, because even in a busy network, with enough samples some packet will traverse the path without waiting for any service, and this packet will have the best round trip time. Thus, NL consists of network device latency (DL) plus network propagation delay (PD):

$$NL=DL+PD. \qquad (3)$$

Device latency is dependent on the speed and number of devices along the connection in the network. In today's networks, the test and target stations have device latencies round trip that sum approximately to 6 ms (i.e., 0.006 seconds). Intermediate routers forward packets with approximately a 0.5 ms delay, so round trip though a router for echo packet forwarding is about 1 ms. Using TRACEROUTE data, the number of routers along the path is determined, so the number of routers*1 ms+6 ms=DL, the round trip across the network connection.

Subtracting device latency from network latency then gives round trip propagation delay:

$$NL-DL=PD. \qquad (4)$$

A network connection's propagation delay is determined by its round trip distance, network quality, and the speed of light. In today's networks quality is improving because of fiber installations replacing copper, and the degree at which the physical rate of signaling degrades by a factor of approximately two (2). (In all-copper networks, the degradation induced by the network quality factor, denoted as NQF, was approximately 2.2.)

The one way distance of a network connection in miles, denoted as D, can be calculated from round trip propagation delay as follows. Since:

[one way distance*2*network quality factor]/speed of light=round trip propagation delay, (5)

or $$[D*2*NQF/186000]=PD,  \quad (6)$$

the network's one way distance (D) is:

$$PD*186000/[2*NQF]=D  \quad (7)$$

Once the distance from a test station 74 to the target station 72 has been determined, that distance describes the radius of a circle, somewhere along the circumference of which the target station lies. As is illustrated, for example, in FIGS. 4 and 5, the distance from each test station to the target station thus determines three circles with one common point 134 or 144 of intersection, which is the location of the target device 72. Thus, by using TCP/IP pinging and Traceroute commands from three test sites 74, 76, 78 in triangular arrangement, the terrestrial location of a target station 72 attached or attaching to the network can be determined.

There are several considerations. First, network quality and device latencies are improving over time. The presently preferred embodiment of the invention uses rules of thumb (the approximations described above) to account for these values in its calculations. Fortunately, testing against known targets will allow the rule of thumb values, which are accurate today, to be adjusted as technological improvements affect these values. Second, the path 81 between a test station 74 and a target station 72, which may be multihop, may not be geographically direct or even terrestrial. Cables may pass under water and over mountains, and thus have a three dimensional aspect that lengthens the apparent distance between a test and target station. In such cases, the fact that the test stations 74, 76, 78 are in known locations will assist the skilled user in determining the degree to which targets 72 appearing certain distances in each direction may have terrain induced elongation. Also, the network connection 81 from a test station 74 to a target 72 may involve a satellite link or a path that crisscrosses or takes an elongated route. In such cases, it will often be possible to determine that such a result (referred to above with respect to FIGS. 6–7 as a long result, or long radius) is anomalous and is to be ignored, and that testing from an additional site or sites may be required to more precisely position target 72. As is illustrated in connection with FIG. 8, in cases where all connections 81, 83, 85 are elongated by satellite, the result will indicate a non-terrestrial network connection. As with GPS, anomalous results will requirtechnical improvements over time.

Heretofore, systems for tuning or optimizing a connection between devices in a data communications network did not involve consideration of the location of the target device. In accordance with an exemplary embodiment of the invention, session content such as selection of national language or text versus graphics can be decided in automated fashion for any server anywhere to the target device based upon knowledge of the location of the target. Further, tuning and performance decisions, such as selecting an appropriate window size for a connection or determining which among several potential servers should be selected to serve a connecting device can be decided based upon location. Further, any such automated decision can include not only geographic distance, but also national or other political or demographic boundary considerations.

Heretofore, determining device location based on triangulation required clear line of sight and specialized receivers in all devices using the system, including requirements for measurement of and adjustments for a variety of atmospheric conditions and for clock coordination among all involved stations. In accordance with exemplary embodiments of the present invention, a system and method is provided for determining the physical location of a target device which is operable indoors, in poor weather, and in downtown and other areas where there are line of sight obstructions, which requires no adjustments for atmospheric conditions, and which requires no clock coordination.

In accordance with the exemplary embodiments of the invention, commands are employed to which virtually all devices that connect to the Internet or perform routing within the Internet respond, and for which their responses use the identical facilities over which they connect to receive service, so that no costly or potentially incompatible additional equipment is required.

It is a characteristic of the preferred embodiments of the present invention that any effort at the target station to tamper with its response will yield recognizably anomalous results that could, from a security perspective, flag the target device as suspicious. Heretofore, computer security systems employ smart cards, physiological characteristic recognition, passwords, encryption keys, and fire walls. It is an advantage of the preferred embodiment that the actual location of the device requesting a connection or service can be utilized in addition to these methods for deciding whether to fulfill the request for service, because theft, deception, alteration of tables, or kidnaping can defeat these security measures, but concealing location by altering ping responses to multiple test stations is either impossible because it is impossible to make a target station appear closer to a test station than it actually is or is extraordinarily difficult. For a target device to make itself appear farther away from a test device than it actually is would require artificially delaying ping responses to different test machines by different amounts in such a way as to cause triangulation to show a specific location. Without knowing the location of the test machines and the full network characteristics of the connection to each and then reverse engineering a solution and delaying pings in precise accordance, this could not be done.

Unlike the GPS system, the above described embodiments of the invention do not require time clock coordination. The GPS system requires time clock coordination for accuracy of its determination of location because the receiver-station must accurately calculate its location based on the location of multiple satellites. The preferred embodiments of the present invention do not require clock coordination because each test station uses pings, or other echo packets, for which it alone is responsible for time stamping. So, each test station calculates distance to the target station independent of time clocks in any other test station and independent of any time clock on the target station.

Advantages Over the Prior Art

It is an advantage of the invention that there is provided an improved system for determining the location of a remote system.

It is an advantage of the invention that there is provided a system and method for fast and effective detection of remote system location.

It is a further advantage of the invention that there is provided a system and method for enhancing system security by determining physical location of a target client system seeking access to a server system across a communications network.

It is a further advantage of the invention that there is provided a system and method for enhancing system performance by determining physical location of a client system with respect to one or more possible server systems coupled to a network.

It is a further advantage of the invention that there is provided a system and method for determining the location of devices connected or connecting to a communications network.

It is a further advantage of the invention that there is provided a system and method for determining the location of devices across multihop communications links using communications common network commands and not requiring clock coordination.

Alternative Embodiments

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as IBM Systems designated as zSeries, iSeries, xSeries, and pSeries, or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

A system and method for determining the physical location of a target device has been described which, using network pinging and traceroute commands executed by three test stations, determines the distance from each test station to the target device. Echo packets other than pings could be used. Also, one way transmissions with time clock coordination between devices could replace pinging. Such time clock coordination is not required if pinging is used.

Accordingly, the scope of protection of this invention is limited only by the following claims and their equivalents.

I claim:

1. A method for determining the physical location of a target device, comprising:
   using network pinging and trace route commands, determining the distances of three test devices of known locations to said target device; and
   responsive to said distances, determining by triangulation the location of said target device.

2. The method of claim 1, said distance from a first test device to said target device being determined by:
   using said trace route command to determine the number of routers in said network between said first test device and said target device;
   using long and short ping transmissions, determining one-way device latency between said first test device and said target device;
   responsive to said one-way device latency, determining the network discrete speed of a connection from said first test device to said target device;
   responsive to said network discrete speed, deriving network total latency from said first test device to said target device;
   responsive to said network total latency, determining network propagation delay between said first test device and said target device; and
   responsive to said network propagation delay, calculating said distance form said first test device to said target device.

3. The method of claim 2, said network speed being derived by:
   transmitting long packets of lb bits and short echo packets of sb bits, with lb>sb, each said packet less than or equal to network maximum transmission unit size (MTU);
   for each packet, determining round trip network time;
   determining lowest detected round trip time (BLT) for said long echo packets;
   determining lowest detected round trip time (BST) for said short echo packets; and
   responsive to said lowest detected round trip time, calculating said network speed (NS).

4. The method of claim 3, said network speed NS being determined as equal to $2*[Lb-Sb]/[BLT-BST]$.

5. The method of claim 3, said distance being derived by:
   determining network latency (NL) as equal to said network device latency (DL) plus said network propagation delay (PD);
   responsive to said network device latency (DL) and said number of routers, determining round trip time across said network connection;
   deriving network connection propagation delay (PD) as the difference between said network latency (NL) and said device latency (DL);
   responsive to said network connection propagation delay and network quality factor (NQF), deriving said distance as equal to $PD*speed\ of\ light/[2*NQF]$.

6. The method of claim 1, further comprising: responsive to said location of said target device, selectively inhibiting access to a network by said target device.

7. The method of claim 1, further comprising: responsive to said location of said target device, connecting said target device to one of a plurality of server systems within a network.

8. A system for determining the physical location of a target device, comprising:
   first, second, and third test devices for issuing pinging and trace route commands;
   each said test device including a distance calculator and a triangulation calculator;
   said distance calculator for determining from execution of said pinging and trace route commands a distance from said test device to said target device; and
   said triangulation calculator for determining a physical location of said target device at an intersection of said distances from known locations of said test devices.

9. A system for determining the distance from a test device to a target device in a network, comprising:
   a network command for issuing pinging and trace route commands; and
   a distance calculator for determining from execution of said pinging and trace route commands a distance from said test device to said target device.

10. The system of claim 9, further comprising: said distance calculator determining distance from a first test device to said target device by:
   determining number of routers in said network between said first test device and said target device using said trace route command;
   determining one-way device latency between said first test device and said target device using long and short ping transmissions;
   responsive to said one-way device latency, determining network discrete speed of a connection from said first test device to said target device;
   responsive to said network discrete speed, deriving network total latency from said first test device to said target device;
   responsive to said network total latency, determining network propagation delay between said first test device and said target device; and
   responsive to said network propagation delay, calculating said distance form said first test device to said target device.

11. The system of claim 10, further comprising: said distance calculator deriving network speed by:
   transmitting long packets of lb bits and short echo packets of sb bits, with lb>sb, each said packet less than or equal to network maximum transmission unit size (MTU);
   for each packet, determining round trip network time;
   determining lowest detected round trip time (BLT) for said long echo packets;
   determining lowest detected round trip time (BST) for said short echo packets; and
   responsive to said lowest detected round trip time, calculating said network speed (NS).

12. The system of claim 11, said network speed NS being determined as equal to 2*[Lb−Sb]/[BLT−BST].

13. The system of claim 11, said distance being derived by:
   determining network latency (NL) as equal to said network device latency (DL) plus said network propagation delay (PD);
   responsive to said network device latency (DL) and said number of routers, determining round trip time across said network connection;
   deriving network connection propagation delay (PD) as the difference between said network latency (NL) and said device latency (DL);
   responsive to said network connection propagation delay and network quality factor (NQF), deriving said distance as equal to PD*speed of light/[2*NQF].

14. A system for determining the distance from a test device to a target device in a network, comprising:
   means for issuing pinging and trace route commands; and
   means for determining from execution of said pinging and trace route commands a distance from said test device to said target device.

15. A management station for determining the location of a target station already coupled to or in the process of coupling to a network, comprising:
   a communications module for communicating with three test stations at known locations;
   a distance calculator for determining from execution of pinging and trace route commands from each said test station to said target device; and
   a triangulation calculator responsive to said distances to said target station from said three test stations for determining said location of said target station at an intersection of said distances from said known locations.

16. A management station for determining the location of a target station already coupled to or in the process of coupling to a network, comprising:
   means for communicating with three test stations at known locations;
   means for determining from execution of pinging and trace route commands distances from each said test station to said target device; and
   means responsive to distances to said target station from said three test stations for determining said location of said target station at an intersection of said distances from said known locations.

17. A method for determining the distance from a test device to a target device, comprising:
   executing a trace route command to determine the number of routers in a network link between said test device and said target device;
   responsive to said trace route command estimating round trip device latency along side network link;
   executing long and short ping transmissions to determine discrete speed between said test device and said target device;
   responsive to said network discrete speed, deriving network total latency of said network link;
   responsive to said network total latency and said device latency, determining network propagation delay of said network link; and
   responsive to said network propagation delay, calculating said distance.

18. A program storage device readable by a machine, tangibly embodying a program of instructions executable by a machine for determining the physical location of a target device according to a method comprising:
   using pinging and trace route network commands, determining distances of three test devices of known locations to said target device; and
   responsive to said distances, determining by triangulation the location of said target device.

19. The program storage device of claim 18, said method further comprising:
   using said trace route command to determine the number of routers in said network between said first test device and said target device;
   using long and short ping transmissions, determining one-way device latency between said first test device and said target device;
   responsive to said one-way device latency, determining the network discrete speed of a connection from said first test device to said target device;
   responsive to said network discrete speed, deriving network total latency from said first test device to said target device;
   responsive to said network total latency, determining network propagation delay between said first test device and said target device; and responsive to said network propagation delay, calculating said distance form said first test device to said target device.

20. A computer program product or computer program element for locating a target device according to a method comprising:
using pinging and trace route communications network commands, determining distances of three test devices of known locations to said target device; and
responsive to said distances, determining by triangulation the location of said target device.

21. A method for determining the physical location of a target device, comprising:
using network pinging and trace route commands, determining the distances of three test devices of known locations to said target device; and
responsive to said distances, determining by triangulation the location of said target device; and
said distance from a first test device to said target device being determined by:
using said trace route command to determine the number of routers in said network between said first test device and said target device;
using long and short ping transmissions, determining one-way device latency between said first test device and said target device;
responsive to said one-way device latency, determining the network discrete speed of a connection from said first test device to said target device;
responsive to said network discrete speed, deriving network total latency from said first test device to said target device;
responsive to said network total latency, determining network propagation delay between said first test device and said target device; and
responsive to said network propagation delay, calculating said distance form said first test device to said target device.

22. The method of claim 21, said network speed being derived by:
transmitting long packets of lb bits and short echo packets of sb bits, with lb>sb, each said packet less than or equal to network maximum transmission unit size (MTU);
for each packet, determining round trip network time;
determining lowest detected round trip time (BLT) for said long echo packets;
determining lowest detected round trip time (BST) for said short echo packets; and
responsive to said lowest detected round trip time, calculating said network speed (NS).

23. The method of claim 22, said network speed NS being determined as equal to $2*[Lb-Sb]/[BLT-BST]$.

24. The method of claim 22, said distance being derived by:
determining network latency (NL) as equal to said network device latency (DL) plus said network propagation delay (PD);
responsive to said network device latency (DL) and said number of routers, determining round trip time across said network connection;
deriving network connection propagation delay (PD) as the difference between said network latency (NL) and said device latency (DL);
responsive to said network connection propagation delay and network quality factor (NQF), deriving said distance as equal to PD*speed of light/$[2*NQF]$.

25. A system for determining the distance from a test device to a target device in a network, comprising:
a network command for issuing pinging and trace route commands;
a distance calculator for determining from execution of said pinging and trace route commands a distance from said test device to said target device; and
said distance calculator determining distance from a first test device to said target device by:
determining number of routers in said network between said first test device and said target device using said trace route command;
determining one-way device latency between said first test device and said target device using long and short ping transmissions;
responsive to said one-way device latency, determining network discrete speed of a connection from said first test device to said target device;
responsive to said network discrete speed, deriving network total latency from said first test device to said target device;
responsive to said network total latency, determining network propagation delay between said first test device and said target device; and
responsive to said network propagation delay, calculating said distance form said first test device to said target device.

26. The system of claim 25, further comprising: said distance calculator deriving network speed by:
transmitting long packets of lb bits and short echo packets of sb bits, with lb>sb, each said packet less than or equal to network maximum transmission unit size (MTU);
for each packet, determining round trip network time;
determining lowest detected round trip time (BLT) for said long echo packets;
determining lowest detected round trip time (BST) for said short echo packets; and
responsive to said lowest detected round trip time, calculating said network speed (NS).

27. The system of claim 26, said network speed NS being determined as equal to $2*[Lb-Sb]/[BLT-BST]$.

28. The system of claim 26, said distance being derived by:
determining network latency (NL) as equal to said network device latency (DL) plus said network propagation delay (PD);
responsive to said network device latency (DL) and said number of routers, determining round trip time across said network connection;
deriving network connection propagation delay (PD) as the difference between said network latency (NL) and said device latency (DL);
responsive to said network connection propagation delay and network quality factor (NQF), deriving said distance as equal to PD*speed of light/$[2*NQF]$.

29. A program storage device readable by a machine, tangibly embodying a program of instructions executable by a machine for determining the physical location of a target device according to a method comprising:
using pinging and trace route network commands, determining distances of three test devices of known locations to said target device;

responsive to said distances, determining by triangulation the location of said target device;

using said trace route command to determine the number of routers in said network between said first test device and said target device;

using long and short ping transmissions, determining one-way device latency between said first test device and said target device;

responsive to said one-way device latency, determining the network discrete speed of a connection from said first test device to said target device;

responsive to said network discrete speed, deriving network total latency from said first test device to said target device;

responsive to said network total latency, determining network propagation delay between said first test device and said target device; and responsive to said network propagation delay, calculating said distance form said first test device to said target device.

* * * * *